United States Patent
Takahashi et al.

(10) Patent No.: US 12,005,477 B2
(45) Date of Patent: Jun. 11, 2024

(54) CONTROL DEVICE

(71) Applicants: Yuki Takahashi, Tokyo (JP); Tomoya Ishitani, Tokyo (JP); Takahiko Irie, Tokyo (JP); Yasutaka Kitamura, Tokyo (JP)

(72) Inventors: Yuki Takahashi, Tokyo (JP); Tomoya Ishitani, Tokyo (JP); Takahiko Irie, Tokyo (JP); Yasutaka Kitamura, Tokyo (JP)

(73) Assignee: MINEBEA MITSUMI, Inc., Nagano (JP)

( * ) Notice: Subject to any disclaimer, the term of this patent is extended or adjusted under 35 U.S.C. 154(b) by 432 days.

(21) Appl. No.: 17/298,054

(22) PCT Filed: Nov. 26, 2019

(86) PCT No.: PCT/JP2019/046105
§ 371 (c)(1),
(2) Date: May 28, 2021

(87) PCT Pub. No.: WO2020/111043
PCT Pub. Date: Jun. 4, 2020

(65) Prior Publication Data
US 2022/0111418 A1   Apr. 14, 2022

(30) Foreign Application Priority Data

Nov. 30, 2018 (JP) ................................. 2018-225984

(51) Int. Cl.
*H02P 25/03* (2016.01)
*B06B 1/02* (2006.01)
(Continued)

(52) U.S. Cl.
CPC ............ *B06B 1/045* (2013.01); *B06B 1/0207* (2013.01); *H02K 33/02* (2013.01); *H02P 25/032* (2016.02)

(58) Field of Classification Search
CPC ...... B06B 1/045; B06B 1/0207; H02P 25/032
See application file for complete search history.

(56) References Cited

U.S. PATENT DOCUMENTS

| | | | |
|---|---|---|---|
| 2010/0309141 A1* | 12/2010 | Cruz-Hernandez | G06F 3/016 345/173 |
| 2011/0279067 A1* | 11/2011 | Murata | H02P 25/032 318/128 |

(Continued)

FOREIGN PATENT DOCUMENTS

| | | |
|---|---|---|
| JP | 2011235267 A | 11/2011 |
| JP | 2015070729 A | 4/2015 |

(Continued)

OTHER PUBLICATIONS

International Search Report from International Application No. PCT/JP2019/046105 dated Feb. 10, 2020.
Extended European Search Report dated Jul. 22, 2022.

*Primary Examiner* — Rina I Duda
(74) *Attorney, Agent, or Firm* — Shih IP Law Group, PLLC

(57) ABSTRACT

Provided is a control device capable of reducing cost and thickness by using an electromagnetic actuator, and capable of efficiently generating a thrust suitable for a haptic feeling feedback to an operator who touches and operates thereto. The control device controls the electromagnetic actuator that drives an operation device supported to be elastically vibrated in one direction of a vibrating direction thereof; includes a current pulse supply unit configured to supply a plurality of drive current pulses to a coil of the electromagnetic actuator as a drive current for driving the operation (Continued)

device in response to a touch operation of the operation device; and an interval between peaks for each of the drive current pulses is in a range of ½ times to 1 times a vibration period of an elastic vibration.

10 Claims, 13 Drawing Sheets

(51) Int. Cl.
*B06B 1/04* (2006.01)
*H02K 33/02* (2006.01)
*H02P 25/032* (2016.01)

(56) References Cited

U.S. PATENT DOCUMENTS

| | | | |
|---|---|---|---|
| 2012/0120008 A1* | 5/2012 | Mori | B06B 1/161 318/377 |
| 2012/0146557 A1* | 6/2012 | Pyo | H02P 31/00 310/25 |
| 2014/0009005 A1 | 1/2014 | Irwin | |
| 2015/0169061 A1* | 6/2015 | Odajima | H02K 33/16 345/173 |
| 2015/0332565 A1* | 11/2015 | Cho | H10N 30/20 310/317 |

FOREIGN PATENT DOCUMENTS

| | | |
|---|---|---|
| JP | 2015-522239 A | 8/2015 |
| JP | 2016163854 A | 9/2016 |

* cited by examiner

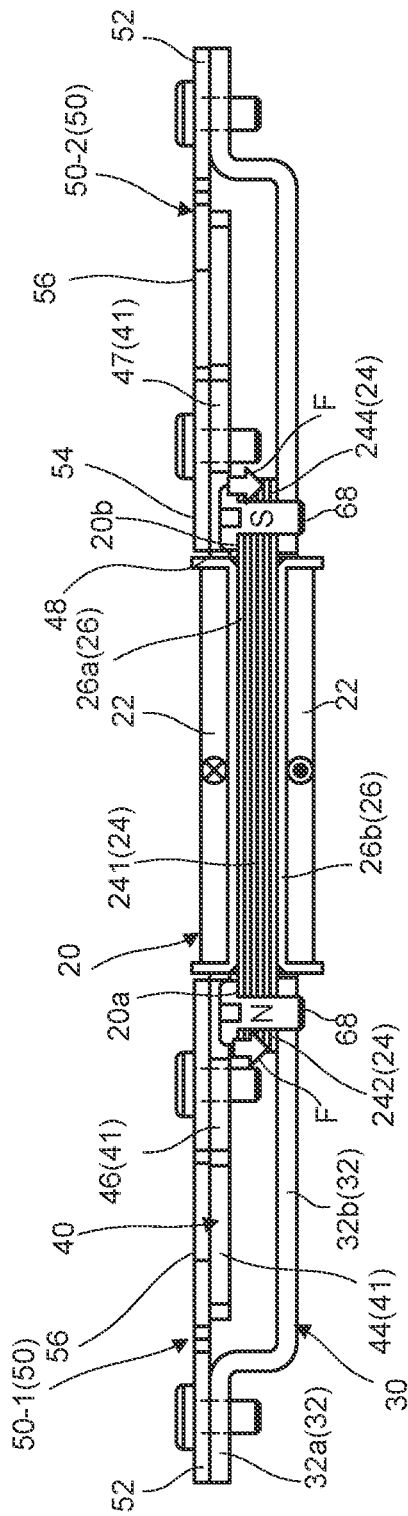
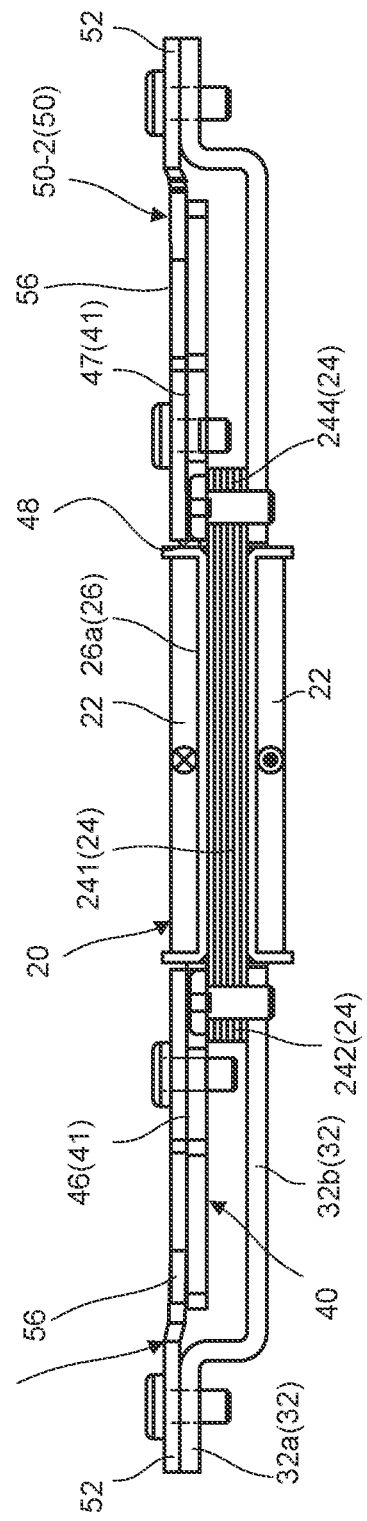
FIG. 9A
FIG. 9B

CONTROL DEVICE

TECHNICAL FIELD

The present invention relates to a control device for driving a vibration actuator.

BACKGROUND ART

Conventionally, at the time of operating a touch panel that is a sensing panel, there is known a configuration in which vibration is given by a vibration actuator as a touch operation feeling (a feeling of being operated by touching) to a finger pulp or the like of an operator who touches a display screen displayed on the touch panel (see PTL 1 and PTL 2).

PTL 1 discloses a portable terminal device in which a vibration actuator is mounted on a back surface of the touch panel via a vibration transmitting part. In this vibration actuator, a movable part is disposed inside a housing fixed to the vibration transmitting part to be reciprocally movable along a guide shaft disposed vertically with respect to the touch panel. This vibration actuator gives vibration to the finger pulp that is touching the touch panel via the vibration transmitting part by causing movable part to collide with the housing in response to operations to the touch panel.

Further, PTL 2 discloses a vibration presenting device that gives vibration in response to operations to the touch panel. In this vibration presenting device, a voice coil motor for generating vibration, a support part that is disposed with a vibration panel and compressed by a prescribed force, a damper that gives breaking work on the vibration of a vibration part, and a spring that gives a compression force to the support part and the damper are provided in parallel between the vibration panel that is the vibration part presenting vibration and a housing that supports the vibration panel.

CITATION LIST

Patent Literature

PTL 1: Japanese Patent Application Laid-Open No. 2015-070729
PTL 2: Japanese Patent Application Laid-Open No. 2016-163854

SUMMARY OF INVENTION

Technical Problem

By the way, when the touch operation feeling is given to the finger pulp or the like of the operator who has touched the touch panel by applying the vibration presenting device to a vehicle-mounted device such as a car navigation system, strong feedback is required as haptic feeling feedback to be the touch operation feeling, and it is desired to reduce the cost of the device itself.

In order to reduce the cost of the device itself, it is conceivable to employ a structure in which an operation device is held by an elastic body by using, for example, a thrust generating mechanism driven by a solenoid without using a relatively expensive magnet as the vibration actuator. In this structure, the operation device is moved by simply inputting pulses to the solenoid to retract and release a movable part of the solenoid held by the elastic body, and the driving direction to the operation device is one direction. In such a solenoid driving structure, a magnitude of a thrust generated to retract the movable part is proportional to a supply voltage, and depends on the size of the actuator itself.

Accordingly, it has been desired to efficiently generate a suitable thrust for haptic feeling feedback while reducing the cost and thickness of the device in recent years.

It is an object of the present invention to provide a control device capable of reducing the cost and the thickness by using an electromagnetic actuator, and capable of efficiently generating a thrust suitable for haptic feeling feedback to an operator who touches and operates thereto.

Solution to Problem

A control device of the present invention for controlling an electromagnetic actuator that drives an operation device supported to be elastically vibrated in one direction of a vibrating direction thereof, the control device comprising:
 a current pulse supply unit configured to supply a plurality of drive current pulses to a coil of the electromagnetic actuator as a drive current for driving the operation device in response to a touch operation of the operation device,
 wherein an interval between peaks for each of the drive current pulses is in a range of ½ times to 1 times a vibration period of an elastic vibration.

Advantageous Effects of Invention

The present invention is capable of reducing the cost and the size by using the electromagnetic actuator, and capable of efficiently generating a thrust suitable for haptic feeling feedback to an operator who touches and operates thereto.

BRIEF DESCRIPTION OF DRAWINGS

FIG. 9A is a diagram for explaining operation of the same electromagnetic actuator;
FIG. 9B is a diagram for explaining operation of the same electromagnetic actuator.

DESCRIPTION OF EMBODIMENTS

Hereinafter, embodiments of the present invention will be described in detail by referring to the accompanying drawings.

An orthogonal coordinate system (X, Y, Z) is used for explanation in the present embodiments. The same orthogonal coordinate system (X, Y, Z) is also used for showing in drawings described later. Hereinafter, the width, length, and height of vibration presenting device 200 having control device 1 are lengths in X direction, Y direction, and Z direction, respectively. The width, length, and height of electromagnetic actuator 10 are also lengths in X direction, Y direction, and Z direction, respectively. In addition, a plus side in Z direction is a direction to give vibration feedback to an operator, which is described as "upper side". A minus side in Z direction is a direction to be pressed when the operator operates, which is described as "lower side".

(Basic Configuration of Vibration Presenting Device 200 Using Control Device 1)

Figure 1:
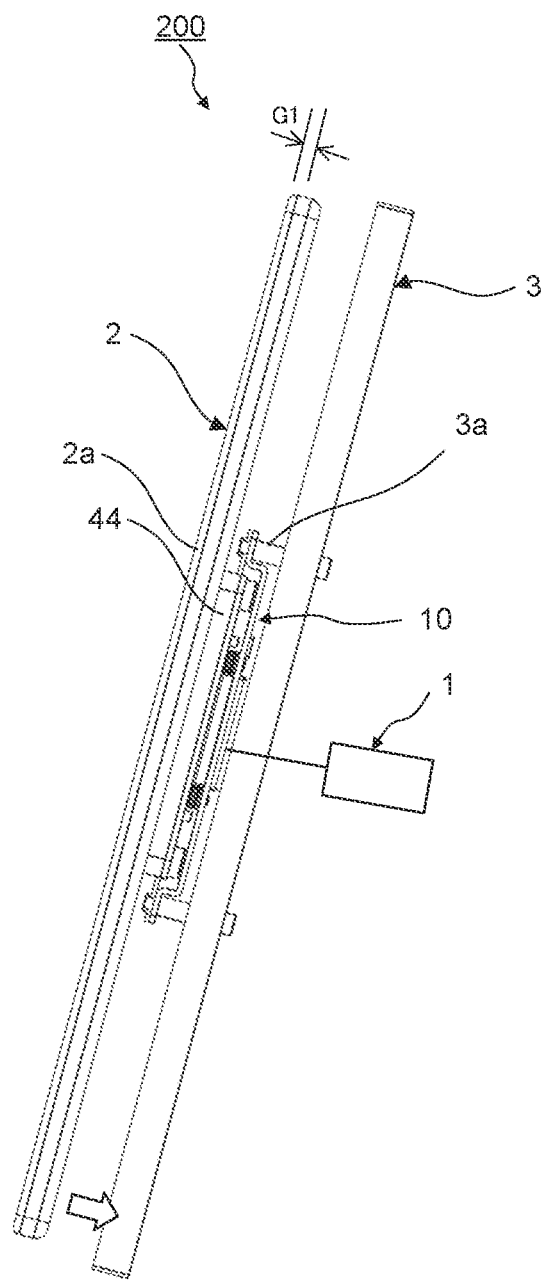
FIG. 1 is a side view showing a vibration presenting device having a control device according to an embodiment of the present invention.

Vibration presenting device 200 shown in FIG. 1 includes control device 1, electromagnetic actuator 10 that is controlled driving by control device 1, and an operation device (touch panel 2) that is performed a touch operation by the operator. In vibration presenting device 200, vibration is given to the operation device in response to the touch operation to the operation device of the operator. That is, a haptic feeling feedback is given to the operator who touches and operates the operation device via the operation device. In the present embodiment, the operation device is touch panel 2 which displays a screen and is operated by touching the screen.

Vibration presenting device 200 is used, for example, as an electronic device, as a touch panel device of a car navigation system, and functions as a device that presents vibration to the operator who operates by touching screen 2a of touch panel 2. Note that in vibration presenting device 200, touch panel 2 as the operation device is a panel having a display function for displaying an image or the like on screen 2a which the operator can touch, but it may be the operation device which does not have a display function and can be simply touched and operated by the operator.

In vibration presenting device 200 shown in FIG. 1, electromagnetic actuator 10 is disposed between touch panel 2 and base 3 as a back surface part of the device disposed at the back surface side of touch panel 2. Control device 1 may be provided in electromagnetic actuator 10 itself or base 3.

Touch panel 2, at the back side thereof, is fixed to surface-part fixing part 44 of movable part 40 (see FIG. 2) of electromagnetic actuator 10. Further, base 3 is disposed to face touch panel 2, a fixing part of electromagnetic actuator 10 is fixed to base 3 via pillar parts 3a. Thus, electromagnetic actuator 10 is disposed so as to connect each other between each of the central portion of touch panel 2 and base 3.

Touch panel 2 itself is driven integrally with movable part 40 of electromagnetic actuator 10. When the operator performs an operation by pressing the screen of touch panel 2, the direction in which the finger or the like of the operator touches the screen, for example, the direction pressing perpendicularly to the screen of touch panel 2 is the same direction as the Z direction which is the vibrating direction of movable part 40 in electromagnetic actuator 10.

Thus, according to vibration presenting device 200 in which control device 1, touch panel 2 and electromagnetic actuator 10 are mounted, touch panel 2 can be directly driven by strong vibration because touch panel 2 can be directly operated, that is, touch panel 2 is driven together with movable part 40 in the same direction as a touching direction of the finger.

Therefore, when an image such as the mechanical switch displayed on touch panel 2 is operated by touching, a vibration to be an operation feeling which corresponds to the image, for example, a vibration to be an operation feeling same as the operation feeling when an actual mechanical switch is operated is given by moving movable part 40, thus achieves a comfortable operation.

<Entire Configuration of Electromagnetic Actuator 10>

Figure 2:
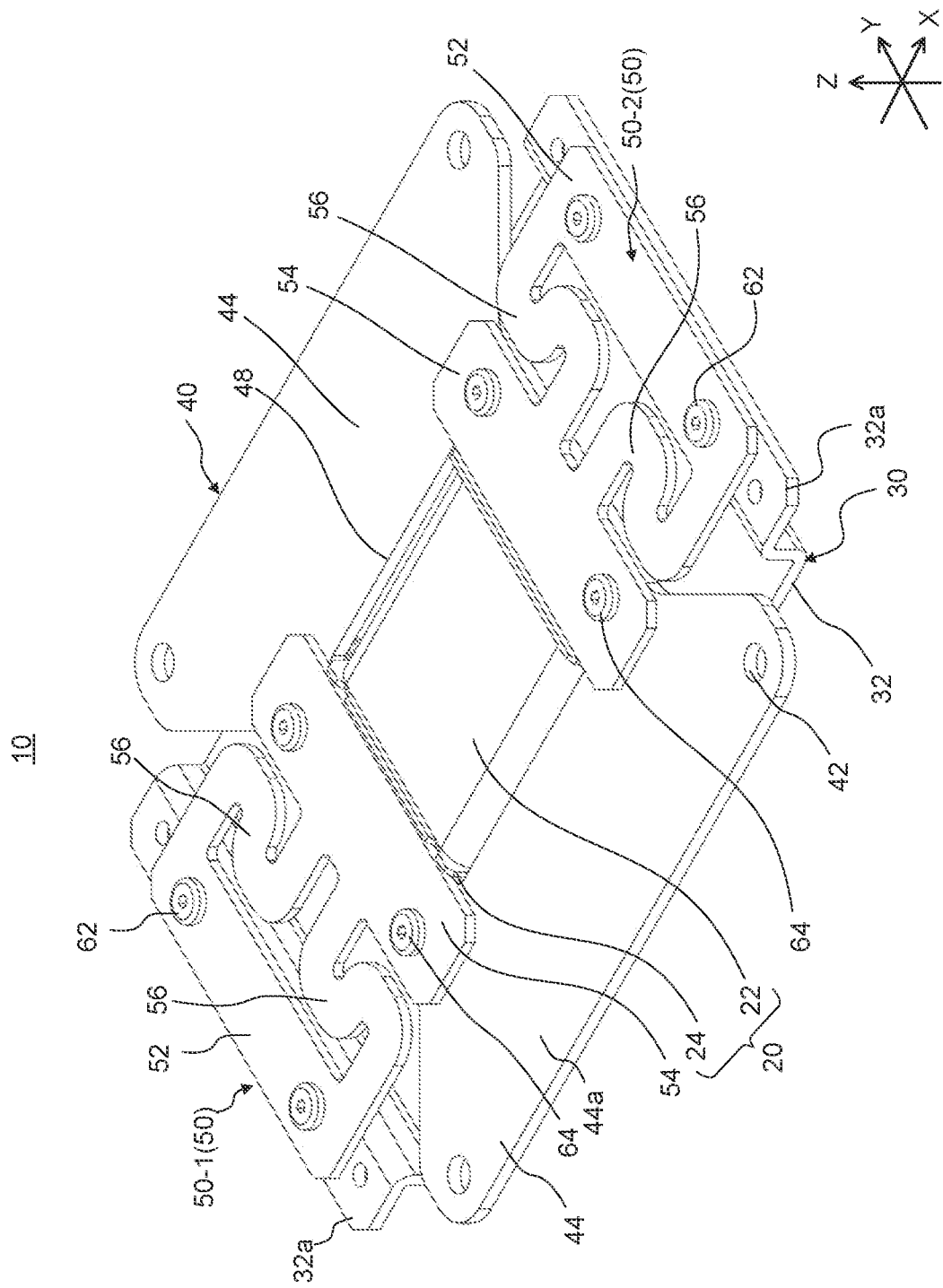
FIG. 2 is a plan side external perspective view of an electromagnetic actuator as an example which is controlled driving by the control device according to an embodiment of the present invention.
Figure 3:
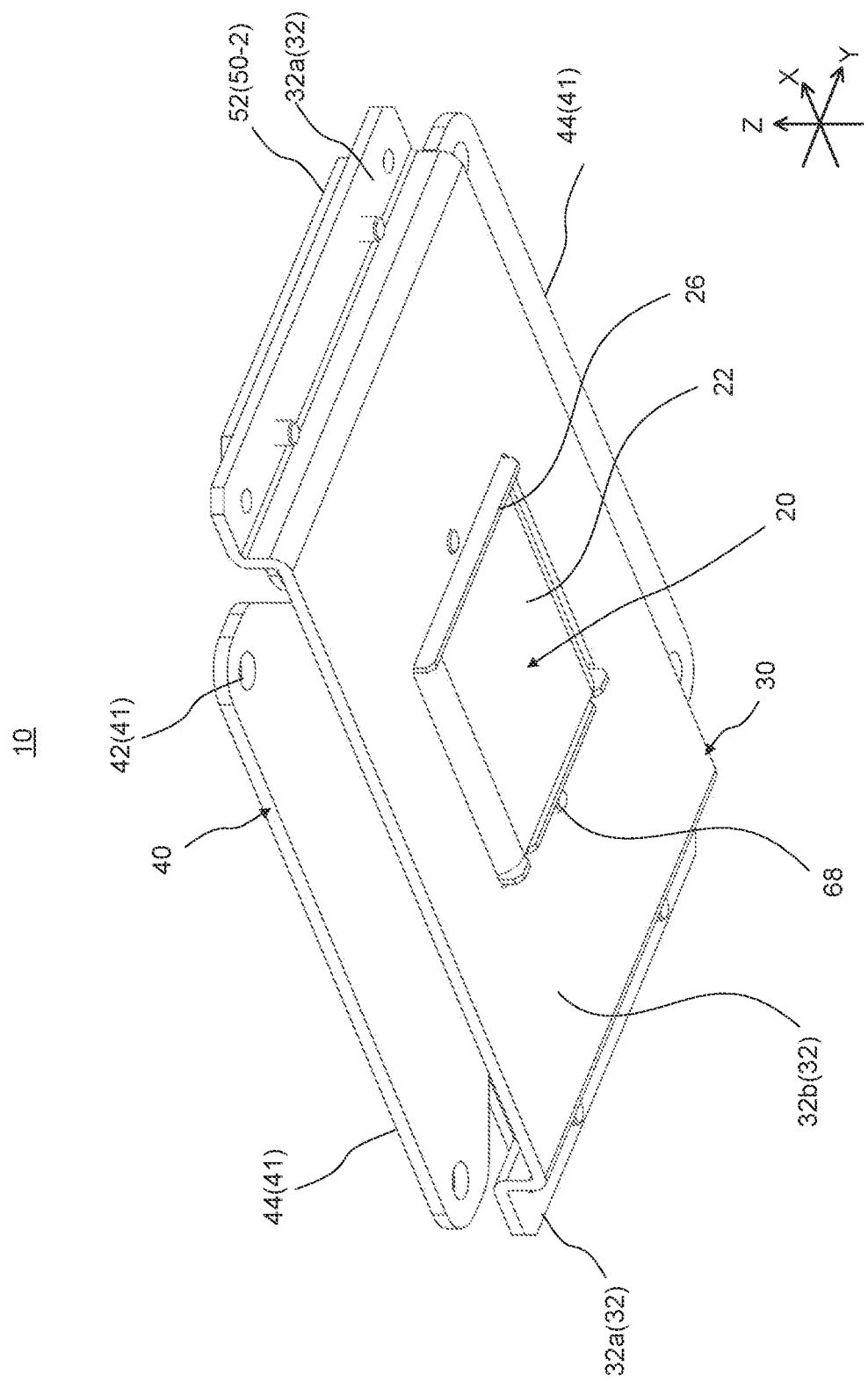
FIG. 3 is a bottom side external perspective view of the same electromagnetic actuator.
Figure 4:
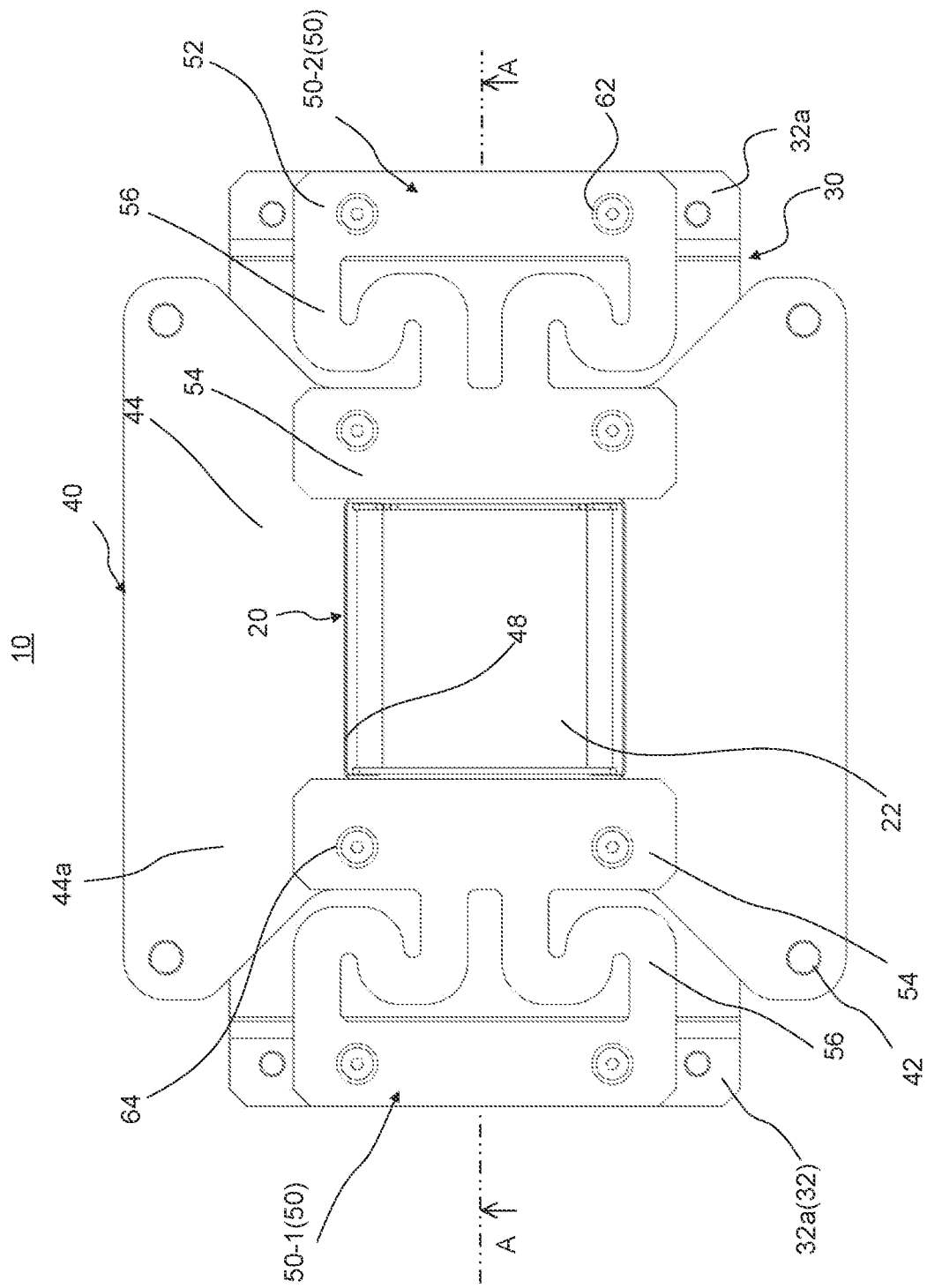
FIG. 4 is a plan view of the same electromagnetic actuator.
Figure 5:
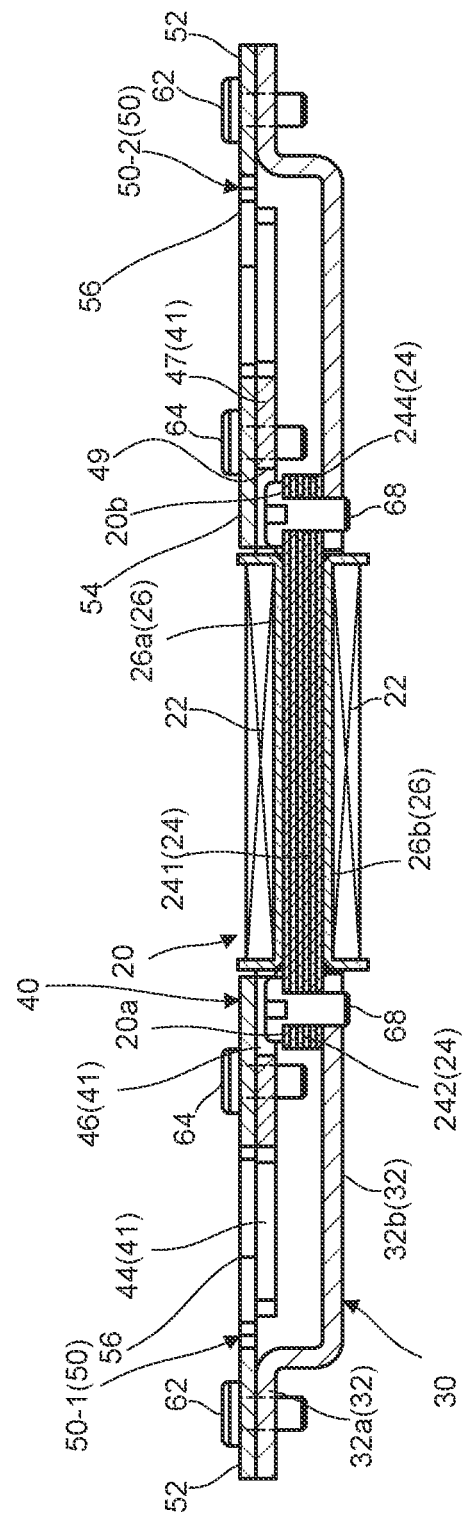
FIG. 5 is a cross-sectional view taken along the line A-A of FIG. 4.
Figure 6:
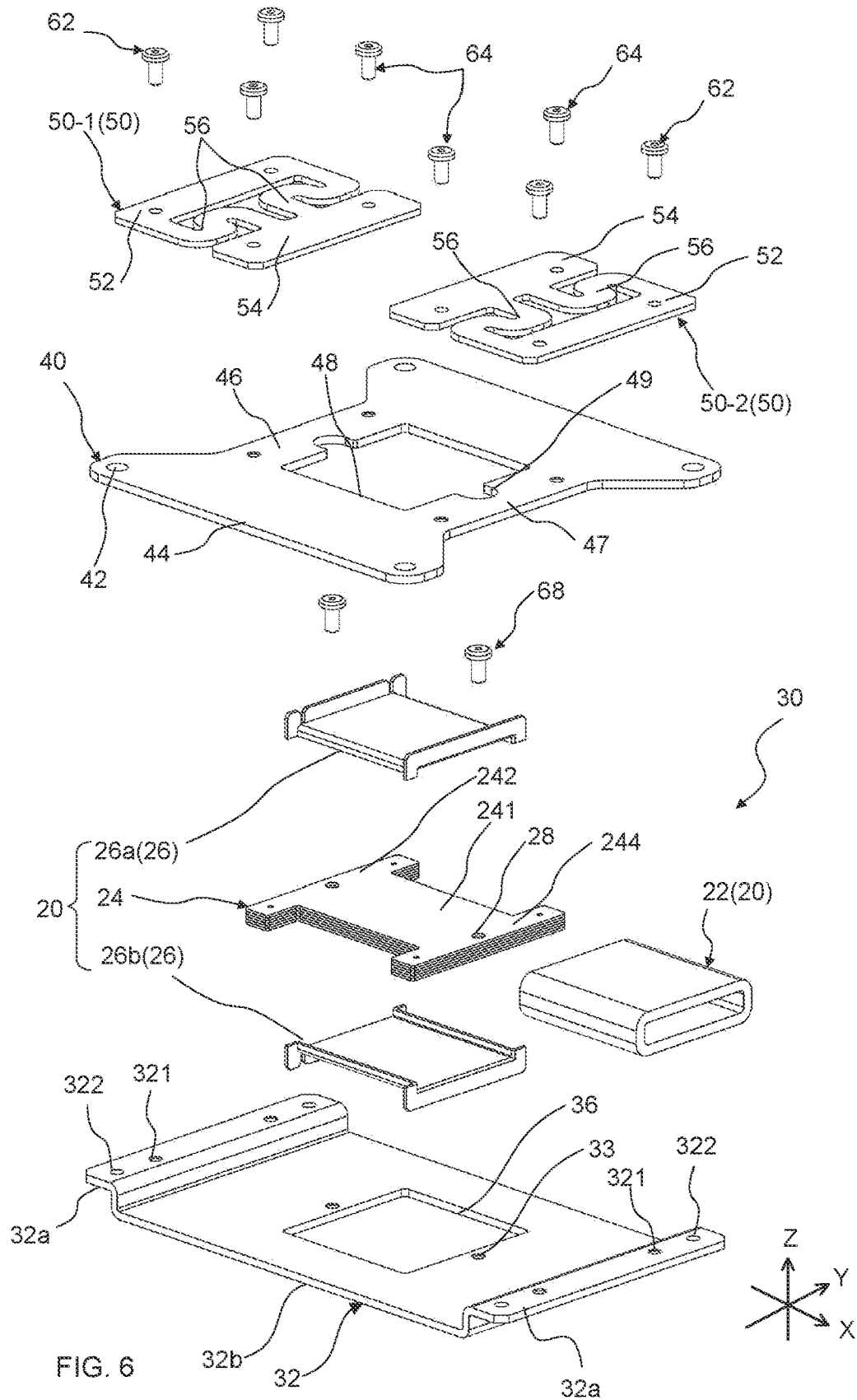
FIG. 6 is an exploded perspective view of the same electromagnetic actuator.

FIG. 2 is a plan side external perspective view of the electromagnetic actuator of the control device according to the embodiment of the present invention, FIG. 3 is a bottom side external perspective view of the same electromagnetic actuator, and FIG. 4 is a plan view of the electromagnetic actuator of the control device according to the embodiment of the present invention. FIG. 5 is a cross-sectional view taken along the line A-A of FIG. 4, and FIG. 6 is an exploded perspective view of the electromagnetic actuator of the control device according to the embodiment of the present invention.

Electromagnetic actuator 10 shown in FIGS. 2 to 6 is mounted in an electronic device to which control device 1 is applied, and functions as a vibration generating source of touch panel 2 (see FIG. 1) which is an example of the operation device.

Electromagnetic actuator 10 includes fixed part 30, and movable part 40 fixed to the operation device and supported by the fixed part 30 so as to be elastically vibrated. Electromagnetic actuator 10 drives movable part 40 in one direction and movable part 40 is moved in a direction opposite to the one direction by an urging force of the members (plate-shaped elastic parts 50) for generating the urging force. This allows electromagnetic actuator 10 to move movable part 40 in a linear reciprocating motion (including vibration).

Electromagnetic actuator 10 allows the operator who touches touch panel 2 to perform intuitive operations by transmitting vibrations to the operator to feel bodily sensations in response to touch operations by the operator on screen 2a of touch panel 2. Note that touch panel 2 includes a touch position output part that receives a touch operation of the operator on touch panel 2 and outputs the touch position thereof. Control device 1 outputs a drive signal to electromagnetic actuator 10 and supplies a drive current so that vibrations corresponding to the touch operations are generated to supply a drive current based on a touch position information output by the touch position output part and a drive timing. Electromagnetic actuator 10 that receives the driving current from control device 1 is driven so as to generate vibrations corresponding to the touch positions output from touch panel 2 and transmits the vibrations to touch panel 2 to directly vibrate touch panel 2. In this way, the operation of the operator received touch panel 2 is received, and electromagnetic actuator 10 is driven correspondingly thereto.

Electromagnetic actuator 10 includes fixing part 30 having base part 32 and core assembly 20 formed by winding coil 22 around core 24, movable part 40 having yokes 41 of the magnetic material, and plate-shaped elastic parts 50 (50-1, 50-2). Plate-shaped elastic parts 50 (50-1, 50-2) elastically support movable part 40 to be movable in the vibrating direction with respect to fixing part 30.

Electromagnetic actuator 10 drives movable part 40 which is movably supported by plate-shaped elastic parts 50 so as to move in one direction with respect to fixing part 30. Further, a movement in the direction opposite to the one direction of movable part 40 is performed by the urging force of plate-shaped elastic parts 50.

Specifically, electromagnetic actuator 10 vibrates yokes 41 of movable part 40 with core assembly 20. Specifically, movable part 40 is vibrated with the attraction force of energized coil 22 and excited core 24 by energized coil 22 as well as the urging force by plate-shaped elastic parts 50 (50-1, 50-2).

Electromagnetic actuator 10 is formed in a flat shape having the Z direction as the thickness direction. Electromagnetic actuator 10 vibrates movable part 40 in the Z direction, i.e., the thickness direction as the vibrating direction with respect to fixing part 30, thereby bringing closer or away one of front and back surfaces spaced apart from each other in the thickness direction of electromagnetic actuator 10 itself with respect to the other surface in the Z direction.

In the present embodiment, electromagnetic actuator 10 moves movable part 40 to the minus side in Z direction as the one direction by the attraction force of core 24, and moves movable part 40 to the plus side in Z direction by the urging force of plate-shaped elastic parts 50 (50-1, 50-2).

In electromagnetic actuator 10 of the present embodiment, movable part 40 is elastically supported by a plurality of plate-shaped elastic parts 50 (50-1, 50-2) that is disposed along the direction orthogonal to the Z direction at point symmetrical positions with respect to the moving center of movable part 40. However, the configuration is not limited thereto.

Plate-shaped elastic parts 50 are fixed between movable part 40 and fixing part 30, includes an elastically deformable meander-shaped part, and elastically supports movable part 40 with respect to fixing part 30 to be movable in the direction opposing to at least one end of both ends (magnetic pole parts 242, 244) of core 24. As long as plate-shaped elastic parts 50 have such a configuration, plate-shaped elastic parts 50 may be provided in any way. For example, plate-shaped elastic parts 50 may elastically support movable part 40 with respect to fixing part 30 (core assembly 20) to be movable in the direction opposing to one end (magnetic pole part 242 or magnetic pole part 244) of core 24. Further, plate-shaped elastic parts 50-1, 50-2 may be disposed line symmetrically with respect to the center of movable part 40 (moving center), and two or more plate-shaped elastic parts 50 may be used. Each of plate-shaped elastic parts 50-1 and 50-2 are fixed to fixing part 30 at one end side and fixed to movable part 40 at the other end side to movably support movable part 40 with respect to fixing part 30 in the vibrating direction (Z direction, and it is up-and-down direction herein).

<Fixing Part 30>

As shown in FIGS. 5 and 6, fixing part 30 includes core assembly 20 having coil 22 and core 24, and base part 32.

Base part 32 has core assembly 20 fixed thereto and connects movable part 40 via plate-shaped elastic parts 50 (50-1, 50-2) to be movable in the vibrating direction. Base part 32 is a flat-shape member, and forms the bottom surface of electromagnetic actuator 10. Base part 32 includes attaching parts 32a to which one end of each of plate-shaped elastic parts (50-1, 50-2) are fixed so as to sandwich core assembly 20. Each of attaching parts 32a is disposed with a same space provided from core assembly 20. Note that the space is a space to be a deforming area of plate-shaped elastic parts 50 (50-1, 50-2).

Attaching parts 32a include fixing holes 321 for fixing plate-shaped elastic parts 50 (50-1, 50-2) and fixing holes 322 for fixing base part 32 to base 3 (see FIG. 1). Fixing holes 322 are provided at both ends of attaching parts 32a so as to sandwich fixing holes 321. Thereby, base part 32 is entirely and stably fixed to base 3 (see FIG. 1).

In the present embodiment, base part 32 is formed by processing a sheet metal and configured such that one side part and the other side part as attaching parts 32a are spaced apart from each other in the width direction (the X direction) with bottom surface part 32b interposed therebetween. A recessed part having bottom surface part 32b lower in height than that of attaching parts 32a is provided between attaching parts 32a. Inside the recessed part, that is, the space on the top surface side of bottom surface part 32b is for securing the elastic deforming area of plate-shaped elastic parts 50 (50-1, 50-2), and for securing a movable area of movable part 40 supported by plate-shaped elastic parts 50 (50-1, 50-2).

Bottom surface part 32b is a rectangular shape, opening part 36 is formed in the center thereof, and core assembly 20 is located inside opening part 36.

Core assembly 20 is fixed inside opening part 36 in a partially inserted state. Specifically, split body 26b of bobbins 26 on the lower side of core assembly 20 and a lower-side part of coil 22 are inserted inside opening part 36, and fixed such that core 24 is located on bottom surface part 32b on a side view. Thereby, length (thickness) in the Z direction becomes decreased as compared with a configuration where core assembly 20 is attached on bottom surface part 32b. Further, core assembly 20 is firmly fixed in a state where it is hard to come off from bottom surface part 32b because a part of core assembly 20, that is, a part of the bottom surface side herein, is fixed while being fitted into opening part 36.

Opening part 36 is a shape corresponding to the shape of core assembly 20. Opening part 36 is formed in a square shape in the present embodiment. Thereby, entire electromagnetic actuator 10 can be shaped substantially into a square shape on a plan view by disposing core assembly 20 and movable part 40 in the center of electromagnetic actuator 10. Note that opening part 36 may be a rectangular shape (including a square shape).

Core assembly 20 vibrates (linearly reciprocates in the Z direction) yokes 41 of movable part 40 in cooperation with plate-shaped elastic parts 50 (50-1, 50-2).

In the present embodiment, core assembly 20 is formed in a rectangular plate-shaped. Magnetic pole parts 242 and 244 are disposed on both side portions of the rectangular plate-shaped spaced from each other in the longitudinal direction. These magnetic pole parts 242 and 244 are disposed so as to oppose to bottom surfaces of attracted surface parts 46 and 47 of movable part 40 with gap G (see FIG. 7) in the Z direction, counter surfaces (counter surface parts) 20a, 20b as the upper surfaces oppose to bottom surfaces of attracted surface parts 46, 47 of yokes 41 in the vibrating direction of movable part 40.

In the present embodiment, core assembly 20 is formed in a rectangular plate-shaped, and has magnetic pole parts 242 and 244 on both side portions spaced from each other in the longitudinal direction. These magnetic pole parts 242 and 244 are disposed so as to oppose to attracted surface parts 46 and 47 of movable part 40 with gap G in the Z direction.

As shown in FIGS. 2 and 4, core assembly 20 is fixed to base part 32 with a winding axis of coil 22 aligned toward the opposing direction of spaced attaching parts 32a in base part 32.

In the present embodiment, core assembly 20 is disposed in the center of base part 32, specifically in the center of bottom surface part 32b.

Core assembly 20 is configured by winding coil 22 around circumference of core 24 via bobbins 26.

As shown in FIG. 5, core assembly 20 is fixed to bottom surface part 32b such that core 24 is located above the bottom surface with being across over opening part 36, and in parallel to bottom surface part 32b. Core assembly 20 is fixed with screws 68 (see FIGS. 1, 4 to 8) as a fastening member in a state where coil 22 and a part (core main body 241) wound around coil 22 are located within opening part 36 of base part 32.

Specifically, core assembly 20 is fixed to bottom surface part 32b by fastening screw 68 through fixing holes 28 and fastening holes 33 (see FIG. 6) of bottom surface part 32b in a state where coil 22 is disposed in opening part 36. Core assembly 20 and bottom surface part 32b are joined at two points on the axial center of coil 22 by sandwiching coil 22 with screws 68 at both side parts of opening part 36 spaced from each other in the X direction and magnetic pole parts 242, 244.

Coil 22 is a solenoid that is energized and generates a magnetic field at the time of driving electromagnetic actuator 10. Coil 22 together with core 24 and movable part 40 forms a magnetic circuit (magnetic path) that attracts and moves movable part 40. Note that power is supplied to coil 22 from an external power source via control device 1. For example, the power is supplied to coil 22 to drive electromagnetic actuator 10 by supplying a driving current from control device 1 to electromagnetic actuator 10.

Core 24 includes core main body 241 around which coil 22 is wound, and magnetic pole parts 242, 244 provided at both ends of core main body 241 and excited by energizing coil 22.

Core 24 may be in any types of configuration as long as it is a configuration having the length with which the both ends can function as magnetic pole parts 242, 244 when coil 22 is energized. For example, while it is possible to employ a straight-type (I-type) tabular shape, core 24 of the present embodiment is formed in an H-type tabular shape on a plan view.

When formed as an I-type core, the area of surfaces (gap side surface) on attracted surface parts 46, 47 side opposing to the both ends (magnetic pole parts) of the I-type core with gap G provided therebetween becomes narrower. Thereby, magnetic resistance in the magnetic circuit may be increased, so that the conversion efficiency may be deteriorated. Further, when the bobbins are attached to the core, there may be no space or may only be a small space for positioning of the bobbins in the longitudinal direction of the core, so that it is necessary to provide the space for positioning separately. In the meantime, because core 24 is the H-type, the gap side surface in the both ends of core main body 241 can be expanded in the front-and-rear directions (Y directions) longer than the width of core main body 241 around which coil 22 is wound, thereby making it possible to decrease the magnetic resistance and improve the efficiency of the magnetic circuit. Further, positioning of coil 22 can be performed by simply fitting bobbins 26 between portions of magnetic pole parts 242, 244 extended out from core main body 241, so that it is unnecessary to separately provide a positioning member of bobbins 26 for core 24.

In core 24, magnetic pole parts 242 and 244 are provided at each of the both ends of tabular core main body 241 around which coil 22 is wound by being projected toward the direction orthogonal to the winding axis of coil 22.

Core 24 is of a magnetic material, and formed from, for example, a silicon steel sheet, permalloy, ferrite or the like. Further, core 24 may also be made of electromagnetic stainless steel, a sintered material, an MIM (metal injection mold) material, a laminated steel sheet, an electrogalvanized steel sheet (SECC), or the like.

Magnetic pole parts 242 and 244 are provided so as to respectively project from inside of both opening parts of coil 22 in the Y direction.

Magnetic pole parts 242 and 244 are excited by energizing coil 22, attract and move yokes 41 of movable part 40 spaced in the vibrating direction (Z direction). Specifically, magnetic pole parts 242 and 244 attract, by a magnetic flux to be generated, attracted surface parts 46 and 47 of movable part 40 counter-disposed via gap G.

Magnetic pole parts 242 and 244 are tabular bodies extended in the Y direction that is the vertical direction with respect to core main body 241 extended in the X direction. Magnetic pole parts 242 and 244 are lengthy in the Y direction, so that the area of counter surfaces 20a and 20b opposing to yokes 41 are wider than the configuration formed in the both ends of core main body 241.

Magnetic pole parts 242 and 244 have fixing holes 28 formed in the central portion in the Y direction thereof, and are fixed to base part 32 by screws 68 inserted into fixing holes 28.

Bobbins 26 are disposed to surround core main body 241 of core 24. Bobbins 26 are formed from a resin material, for example. This makes it possible to secure electrical insulation with other metallic members (for example, core 24), so that reliability as the electric circuit can be improved. By using a resin of high fluidity for the resin material, formability can be improved so that the thickness can be decreased while securing the strength of bobbins 26. Note that split bodies 26a and 26b are mounted so as to sandwich core main body 241, so that bobbins 26 are formed in a cylindrical shape that covers the periphery of core main body 241. Note that in bobbins 26, a flange is provided to the both ends of the cylindrical body so that coil 22 is defined so as to be located on the outer circumference of core main body 241.

<Movable Part 40>

Movable part 40 is disposed to oppose to core assembly 20 with gap G provided therebetween in the direction orthogonal to the vibrating direction (Z direction). Movable part 40 is provided to be able to reciprocally vibrate in the vibrating direction with respect to core assembly 20.

Movable part 40 includes yokes 41, and includes movable-part side fixing parts 54 of plate-shaped elastic parts 50-1 and 50-2 fixed to yokes 41.

Movable part 40 is disposed in a state (standard normal position) being hanged while being spaced substantially in parallel and to be movable in the approaching/leaving direction (Z direction) with respect to bottom surface part 32b via plate-shaped elastic parts 50 (50-1, 50-2).

Yoke 41 is a tabular body made of a magnetic material such as electromagnetic stainless steel, a sintered material, an MIM (metal injection mold) material, a laminated steel sheet, an electrogalvanized steel sheet (SECC), or the like. In the present embodiment, yoke 41 is formed by processing an SECC sheet.

Yokes 41 are hanged to oppose to core assembly 20 with gap G (see FIG. 7) provided therebetween in the vibrating direction (Z direction) by plate-shaped elastic parts 50 (50-1, 50-2) fixed to respective attracted surface parts 46 and 47 spaced from each other in the X direction.

Yokes 41 include surface-part fixing parts 44 to which the operation device (see touch panel 2 shown in FIG. 1) is attached, and attracted surface parts 46 and 47 counter-disposed with respect to magnetic pole parts 242 and 244.

In the present embodiment, yoke 41 has opening part 48 (fixing-part side opening part) in the center thereof. Yoke 41 is formed in a rectangular frame shape. Yoke 41 is formed in a frame shape surrounding opening part 48 with surface-part fixing part 44 and attracted surface parts 46, 47.

Opening part 48 opposes to coil 22. In the present embodiment, opening part 48 is located right above coil 22, and the opening shape of opening part 48 is formed in a shape to which coil 22 part of core assembly 20 can be inserted when yokes 41 moves to bottom surface part 32b side.

By configuring yokes 41 to have opening part 48, the thickness of the entire electromagnetic actuator can be decreased as compared to a case having no opening part 48.

Further, core assembly 20 is located within opening part 48, so that yokes 41 are not disposed in the vicinity of coil 22. Therefore, it is possible to suppress deterioration in the conversion efficiency due to the magnetic flux leaked from coil 22, so that high output can be achieved.

Surface-part fixing part 44 includes fixing surface 44a that comes in surface-contact to fix touch panel 2 as an example of the operation device. Fixing surface 44a forms a trapezoid shape on a plan view, and surface-contacts with touch panel 2 that is fixed to surface-part fixing part 44 via fastening member such as a screw inserted into surface-part fixing holes 42.

Attracted surface parts 46, 47 are attracted to magnetic pole parts 242 and 244 magnetized in core assembly 20, and plate-shaped elastic parts 50 (50-1, 50-2) are fixed thereto.

Movable-part side fixing parts 54 of plate-shaped elastic parts 50-1 and 50-2 are fixed by being laminated, respectively, on attracted surface parts 46 and 47. Attracted surface parts 46 and 47 are provided with cutouts 49 functioning as clearance of the heads of screws 68 of core assembly 20 when moved to bottom surface part 32b side.

Thereby, even when movable part 40 moves to bottom surface part 32b side and attracted surface parts 46, 47 approach magnetic pole parts 242, 244, attracted surface parts 46, 47 are not to be in contact with screws 68 that fix magnetic pole parts 242, 244 to bottom surface part 32b, so that movable areas of yokes 41 in the Z direction can be secured for that.

<Plate-Shaped Elastic Parts 50 (50-1, 50-2)>

Plate-shaped elastic parts 50 (50-1, 50-2) movably support movable part 40 with respect to fixing part 30. Plate-shaped elastic parts 50 (50-1, 50-2) support the upper surface of movable part 40 so as to be parallel to each other at the same height as the upper surface of fixing part 30, or at the lower surface side of the upper surface of fixing part 30 (the upper surface of core assembly 20 in this embodiment). Plate-shaped elastic parts 50-1 and 50-2 have a symmetrical shape with respect to the center of movable part 40, and are members formed in the same manner in the present embodiment.

Plate-shaped elastic parts 50 are arranged yokes 41 substantially in parallel so as to face to magnetic pole parts 242 and 244 of core 24 of fixing part 30 with a gap G. Plate-shaped elastic parts 50 movably support the lower surface of movable part 40 in the vibrating direction at the position of bottom surface part 32b side of the substantially same height level as the height level of the upper surface of core assembly 20.

Plate-shaped elastic part 50 is a plate spring including fixing-part side fixing part 52, movable-part side fixing part 54, and meander-shaped elastic arm parts 56 that communicate fixing-part side fixing part 52 with movable-part side fixing part 54.

Plate-shaped elastic part 50 attaches fixing-part side fixing part 52 to the surface of attaching parts 32a, attaches movable-part side fixing parts 54 to the surfaces of the attracted surface parts 46 and 47 of yokes 41, and attaches movable part 40 with meander-shaped elastic arm parts 56 parallel to bottom surface part 32b.

Fixing-part side fixing parts 52 are joined and fixed by screws 62 in surface-contact with attaching parts 32a, and movable-part side fixing parts 54 are joined and fixed by screws 64 in surface-contact with the attracted surface parts 46 and 47.

Meander-shaped elastic arm part 56 is an arm part having a meander-shaped part. Since meander-shaped elastic arm part 56 is the arm part having the meander-shaped part, meander-shaped elastic arm part 56 secures a length that allows deformation necessary for vibration of movable part 40 between fixing-part side fixing part 52 and movable-part side fixing part 54 and in a plane (a plane formed in the X direction and the Y direction) orthogonal to the vibration direction.

Meander-shaped elastic arm part 56 in the present embodiment extends and folds back in the opposing direction of fixing-part side fixing parts 52 and movable-part side fixing parts 54, and ends of meander-shaped elastic arm part 56 respectively joined to fixing-part side fixing parts 52 and movable-part side fixing parts 54 are formed at positions shifted in the Y direction. Meander-shaped elastic arm parts 56 are disposed in a position of point symmetry or line symmetry with respect to the center of movable part 40.

Thereby, movable part 40 is supported from both sides by meander-shaped elastic arm parts 56 having meander-shaped springs, so that it is possible to disperse the stress at the time of elastic deformation. That is, plate-shaped elastic parts 50 can move movable part 40 in the vibrating direction (Z direction) without tilting with respect to core assembly 20, thereby making it possible to improve reliability of the vibrating state.

Since each of plate-shaped elastic parts 50 includes at least two or more meander-shaped elastic arm parts 56, compared to a case where one meander-shaped elastic arm part 56 is provided respectively, plate-shaped elastic parts 50 make it possible to improve the reliability by dispersing the stress at the time of elastic deformation and to improve the stability by balancing the support for movable part 40 better.

In the present embodiment, the plate springs as plate-shaped elastic parts 50 are formed from a magnetic material. Further, movable-part side fixing parts 54 of plate-shaped elastic parts 50 are disposed at positions opposing to both ends (magnetic pole parts 242, 244) of core 24 in a coil winding axis direction or on the upper side thereof and function as a magnetic path. In the present embodiment, movable-part side fixing parts 54 are fixed by being laminated on the upper side of the attracted surface parts 46 and 47. This makes it possible to increase thickness H (see FIG.

7) of the attracted surface parts 46 and 47 opposing to the magnetic pole parts 242, 244 of core assembly 20 as the thickness of the magnetic material. The thickness of plate-shaped elastic parts 50 and the thickness of yokes 41 are the same, so that the cross sectional area of the magnetic material portion opposing to magnetic pole parts 242, 244 can be doubled. Thereby, compared to a case where the plate spring is nonmagnetic, it is possible to ease the degradation of properties due to magnetic saturation in magnetic circuits and to improve the output, by expanding the magnetic circuit.

Figure 7:
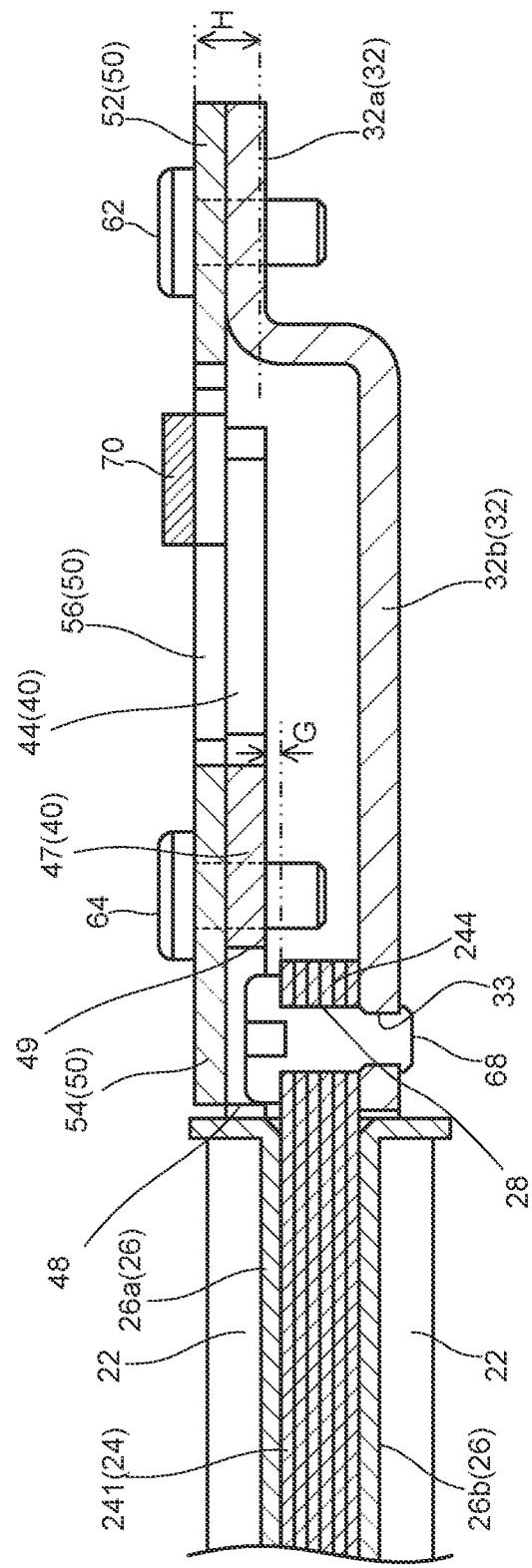
FIG. 7 is a cross-sectional view showing a situation in which a sensor is provided in the same electromagnetic actuator.

Note that in electromagnetic actuator 10 of the present embodiment, a detection part that detects push-in amount of movable part 40 may be provided when the operation surface part fixed by surface-part fixing part 44 is operated. In the present embodiment, for example, as shown in FIG. 7, strain detection sensor 70 that detects strain of plate-shaped elastic parts 50 is provided as a detection part.

Strain detection sensor 70 detects strain of plate-shaped elastic parts 50 that are deformed when surface-part fixing part 44 is pushed into bottom surface part 32b side. Detected strain is output to a control unit and the like, coil 22 is energized to attract and move yokes 41 such that movable part 40 moves in an amount corresponding to the strain.

In the present embodiment, electromagnetic actuator 10 functions as long as touch to the operation device can be detected without determining the moving amount of the operation device being operated. On the other hand, if the push-in amount against plate-shaped elastic parts 50 can be detected with the moving amount corresponding to the moving amount of the actual operation device, electromagnetic actuator 10 can express a more natural feeling by using this detection result. Further, based on the detection result of the sensor that detects the touch operation of the operator, i.e. the push-in amount of movable part 40, like strain detection sensor 70, the vibration period of movable part 40 (touch panel 2 as the operation device) may be adjusted when a current pulse supply unit of control device 1 outputs a drive current pulse.

In meander-shaped elastic arm parts 56 of plate-shaped elastic parts 50, strain detection sensor 70 is attached to the vicinity of the base having large distortion, and placed to an area that does not interfere with the other member, so-called dead space. Note that instead of strain detection sensor 70, a detection part for push-in detection such as an electrostatic capacity sensor which measures the distance to plate-shaped elastic parts 50 which are pushed in and displaced may be placed on bottom surface part 32b facing the deformable portion of plate-shaped elastic parts 50 under plate-shaped elastic parts 50.

Figure 8:
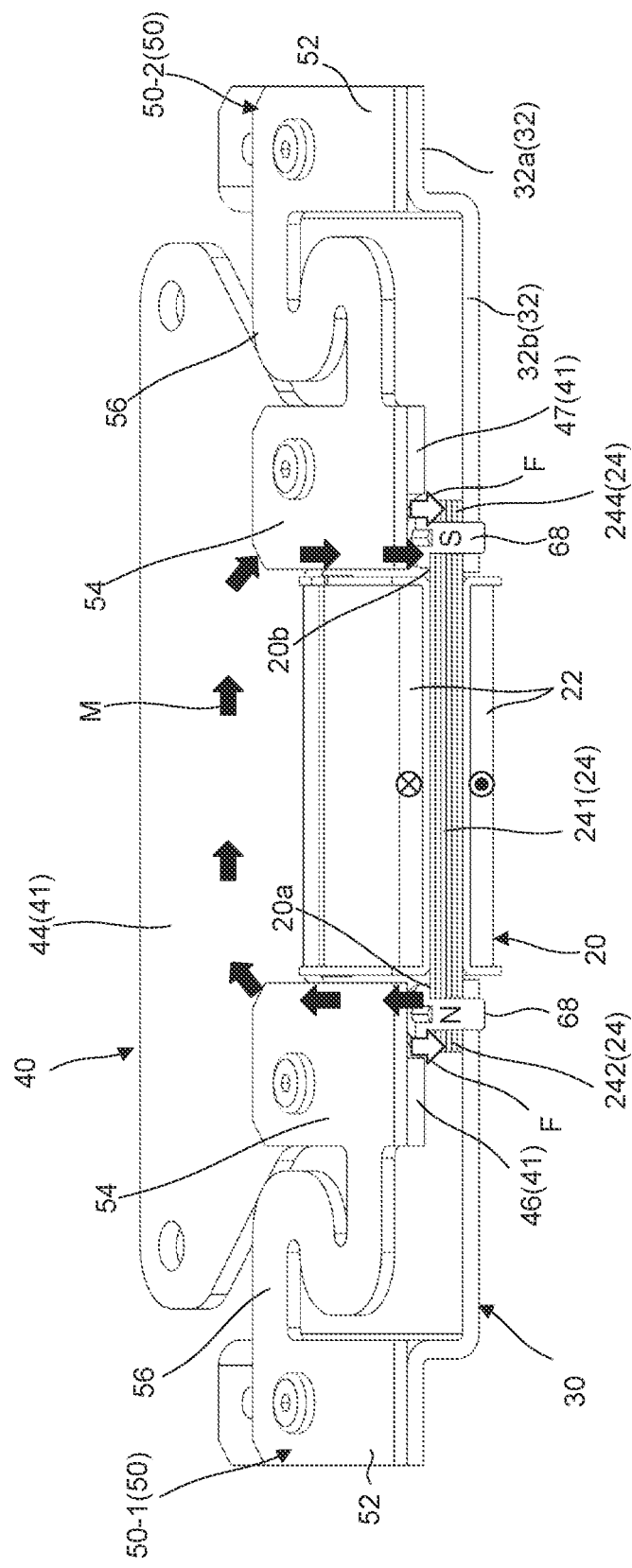
FIG. 8 is a diagram showing a magnetic circuit configuration of the same electromagnetic actuator.

FIG. 8 is a diagram showing a magnetic circuit of electromagnetic actuator 10. Note that FIG. 8 is a perspective view of electromagnetic actuator 10 cut by the line A-A in FIG. 4. The portion of the magnetic circuit not shown has the same magnetic flux flow M as the portion of the magnetic circuit shown. Further, FIG. 9 is a cross-sectional view schematically showing the movement of movable part by the magnetic circuit. In particular, FIG. 9A is a diagram showing a state in which movable part 40 is held at a position separated from core assembly 20 by the plate-shaped elastic parts 50. FIG. 9B shows a movable part 40 which is moved is attracted to core assembly 20 side by the magnetomotive force by the magnetic circuit.

Specifically, when coil 22 is energized, core 24 is excited and a magnetic field is generated, and both ends of core 24 become magnetic poles. For example, as shown in FIG. 8, magnetic pole part 242 becomes the N-pole, and magnetic pole part 244 becomes the S-pole in core 24. Thereby, the magnetic circuit indicated by magnetic flux flow M is formed between core assembly 20 and yokes 41. Magnetic flux flow M in the magnetic circuit flows from magnetic pole part 242 to opposing attracted surface part 46 of yokes 41, passes through surface-part fixing part 44 of yokes 41, and reaches magnetic pole part 244 opposing to attracted surface part 47 from attracted surface part 47.

In the present embodiment, since plate-shaped elastic parts 50 are also of magnetic materials, the magnetic flux (shown by a magnetic flux flow M) flown to attracted surface part 46 first passes through attracted surface part 46 of yokes 41 and movable-part side fixing parts 54 of plate-shaped elastic part 50-1. Then, the magnetic flux (magnetic flux flow M) reaches attracted surface part 47 and both ends of movable-part side fixing parts 54 of plate-shaped elastic part 50-2 via surface-part fixing part 44 from both ends of attracted surface part 46.

Thereby, according to the principle of electromagnetic solenoid, magnetic pole parts 242, 244 of core assembly 20 generate attraction force F for attracting attracted surface parts 46, 47 of yokes 41. Then, attracted surface parts 46, 47 of yokes 41 are attracted to both of magnetic pole parts 242, 244 of core assembly 20, coil 22 is inserted into opening part 48 of yokes 41, and movable part 40 including yokes 41 moves in F-direction against the urging force of plate-shaped elastic parts 50 (see FIG. 9A and FIG. 9B).

When energization to coil 22 is stopped, the magnetic field disappears, attraction force F of core assembly 20 for movable part 40 is lost, and movable part 40 is moved back to the original position (moved to −F direction) by the urging force of plate-shaped elastic parts 50.

By repeating such action described above, in electromagnetic actuator 10, movable part 40 reciprocally moves to generate vibration in the vibrating direction (Z direction).

By reciprocating movable part 40 in a linear manner, touch panel 2 as the operation device to which movable part 40 is fixed, is also displaced in the Z direction following movable part 40. In the present embodiment, the displacement of movable part 40 due to driving, that is, the displacement G1 (see FIG. 1) of touch panel 2 is in a range of 0.03 mm to 0.3 mm.

This range of the displacement results from the fact that when the operator presses screen 2a of touch panel 2 as the operation device, a small displacement of the haptic feeling feedback given to the operator may cause insufficient feeling, and a large displacement may cause discomfort.

A sensitivity evaluation to the displacement of the touch panel has been performed for a plurality of subjects A to D. The results are shown in Table 1. Specifically, the displacement (amplitude [mm]) of the touch panel has been set in the range of 0.03 to 0.3 when the subjects A to D have touched the touch panel, and the haptic feeling and the visual sense has been evaluated in the respective displacement states. As an evaluation criteria, "Good" for good, "acceptable" for acceptable and "N/A" for unpleasant are decision criteria for the evaluation of "haptic feeling", and "Good" for good, "acceptable" for slightly difficult to see and "N/A" for difficult to see are decision criteria for the evaluation of "visual sense".

TABLE 1

| Amplitude [mm] | | 0.03 | 0.05 | 0.1 | 0.15 | 0.2 | 0.25 | 0.3 |
|---|---|---|---|---|---|---|---|---|
| Haptic feeling | Subject A | N/A | Acceptable | Good | Good | Good | Good | Acceptable |
| | Subject B | N/A | Acceptable | Good | Good | Good | Acceptable | N/A |
| | Subject C | Acceptable | Acceptable | Good | Good | Acceptable | Acceptable | N/A |
| | Subject D | Acceptable | Good | Good | Good | Acceptable | Acceptable | Acceptable |
| Visual sense | Subject A | Good | Good | Good | Good | Good | Acceptable | N/A |
| | Subject B | Good | Good | Good | Acceptable | N/A | N/A | N/A |
| | Subject C | Good | Good | Good | Good | Acceptable | N/A | N/A |
| | Subject D | Good | Good | Good | Acceptable | N/A | N/A | N/A |

In particular, when a display such as touch panel 2 is moved, a large displacement causes a problem of visual disturbance.

As can be seen from Table 1, when the displacement G1 (see FIG. 1) is smaller than 0.03 mm, a feeling of the haptic feeling feedback becomes insufficient, and many evaluations of "acceptable" for acceptable and "N/A" for unpleasant have been made in Table 1. As a result, the allowable displacement G1 shall be 0.03 mm or more. Further, when the displacement is larger than 0.3 mm, the haptic feeling becomes strongly "unpleasant" or the visual disturbance such as distorted screen appearances is more likely to occur. As a result, the allowable displacement G1 shall be 0.25 mm or less. Accordingly, the displacement G1 is preferably in a range of 0.03 mm to 0.2 mm, more preferably in a range of 0.05 mm to 0.15 mm. Even more preferably, the displacement G1 is 0.1 mm or in the vicinity of 0.1 mm. As a result, a sufficient haptic feeling can be given to the operator within a range in which the visual disturbance is suppressed.

In electromagnetic actuator 10, it is possible to increase the efficiency of the magnetic circuit and achieve high output by disposing attracted surface parts 46, 47 of yokes 41 close to magnetic pole parts 242, 244 of core assembly 20. Further, electromagnetic actuator 10 uses no magnet, so that a low-cost configuration can be achieved. Meander-shaped springs that are plate-shaped elastic parts 50 (50-1, 50-2) enable dispersion of the stress, so that the reliability can be improved. Especially, because movable part 40 is supported by a plurality of plate-shaped elastic parts 50 (50-1, 50-2), more effective dispersion of the stress is possible. As described, electromagnetic actuator 10 is capable of providing a more direct sense of touch by driving up-and-down direction thereto.

Core assembly 20 having core 24 around which coil 22 is wound is fixed to fixing part 30. This core assembly 20 is disposed in opening part 48 of yokes 41 of movable part 40 which is movably supported in Z direction by plate-shaped elastic parts 50 with respect to fixing part 30. Thereby, it becomes unnecessary to stack members provided for each of the fixing part and movable part in Z direction (e.g., place the coil and magnet opposite each other in Z direction) in order to generate magnetism to drive the movable part in Z direction, so that the thickness in Z direction can be reduced as the electromagnetic actuator. Further, by driving movable part 40 in a reciprocating linear motion, the operation device can give the vibration as the haptic feeling without using a magnet. Thus, the design becomes simple because the support structure is simple, it is possible to save space, it is possible to reduce the thickness of electromagnetic actuator 10. Further, because a magnet is not used, it is possible to reduce the cost as compared with the configuration in which a magnet is used.

Hereinafter, the driving principle of electromagnetic actuator 10 will simply be described. Electromagnetic actuator 10 can be driven by generating a resonance phenomenon with a pulse by using following motion equation and circuit equation. Note that the actions are not resonance driven but for expressing operational feeling of mechanical switches displayed on the touch panel as the operation device. In the present embodiment, it is driven by inputting short pulses through a control unit not shown, but it may be driven to generate arbitrary vibrations without using short pulses. Examples of the mechanical switch may be a tactile switch, alternate-type switch, a momentary switch, a toggle switch, a slide switch, a rotary switch, a DIP switch, and a rocker switch.

Note that movable part 40 in electromagnetic actuator 10 performs reciprocating motion based on the equation (1), (2).

[Equation 1]

$$m\frac{d^2x(t)}{dt^2} = K_f i(t) - K_{sp}x(t) - D\frac{dx(t)}{dt} \quad (1)$$

m: Mass [kg]
x(t): Displacement [m]
$K_f$: Thrust constant [N/A]
i(t): Current [A]
$K_{sp}$: Spring constant [N/m]
D: Damping coefficient [N/(m/s)]

[Equation 2]

$$e(t) = Ri(t) + L\frac{di(t)}{dt} + K_e\frac{dx(t)}{dt} \quad (2)$$

e(t): Voltage [V]
R: Resistance [Ω]
L: Inductance [H]
$K_e$: Counter electromotive force constant [V/(rad/s)]

That is, mass "m" [kg], displacement "x(t)" [m], thrust constant "$K_f$" [N/A], current "i(t)" [A], spring constant "$K_{sp}$" [N/m], and damping coefficient "D" [N/(m/s)] in electromagnetic actuator 10 can be changed as appropriate within the range satisfying Equation (1). Also, voltage "e(t)" [V], resistance "R" [Ω], inductance "L" [H], and counter electromotive force constant "$K_e$" [V/(rad/s)] can be changed as appropriate within the range satisfying Equation (2).

As described, the drive of electromagnetic actuator 10 is determined based on mass "m" of movable part 40, and spring constant $K_{sp}$ of metal springs (elastic bodies; plate springs in the present embodiment) as plate-shaped elastic parts 50.

Further, in electromagnetic actuator 10, screws 62 and 64 are used for fixing base part 32 and plate-shaped elastic parts 50 and for fixing plate-shaped elastic parts 50 and movable part 40. Thereby, plate-shaped elastic parts 50 required to be firmly fixed to fixing part 30 and movable part 40 for allowing movable part 40 to drive can be firmly fixed mechanically in a state capable of reworking.

<Control Device 1>

Control device 1 controls electromagnetic actuator 10 that drives the operation device (touch panel 2 in FIG. 1) supported elastically to vibrate in one direction in the vibrating direction.

Control device 1 supplies the drive current to electromagnetic actuator 10 in response to the touch operation of the operation device to move the elastically vibratable movable part 40 in one direction, here in the −Z direction, with respect to fixing part 30.

Control device 1 supplies the drive current to electromagnetic actuator 10 to move touch panel 2 in the −Z direction with respect to base 3 to which fixing part 30 is fixed by drawing movable part 40 back to fixing part 30. Control device 1 stops supplying the drive current to coil 22 to release movable part 40, and movable part 40 is urged by plate-shaped elastic parts 50 to move in a direction opposite to a drawn direction.

When the operator touches the operation device, control device 1 combines two or more current pulses and outputs them to coil 22 of electromagnetic actuator 10 to drive movable part 40, drives electromagnetic actuator 10, and gives the operator with the haptic feeling when touching the operation device through the operation device (touch panel 2 in FIG. 1).

Figure 10:
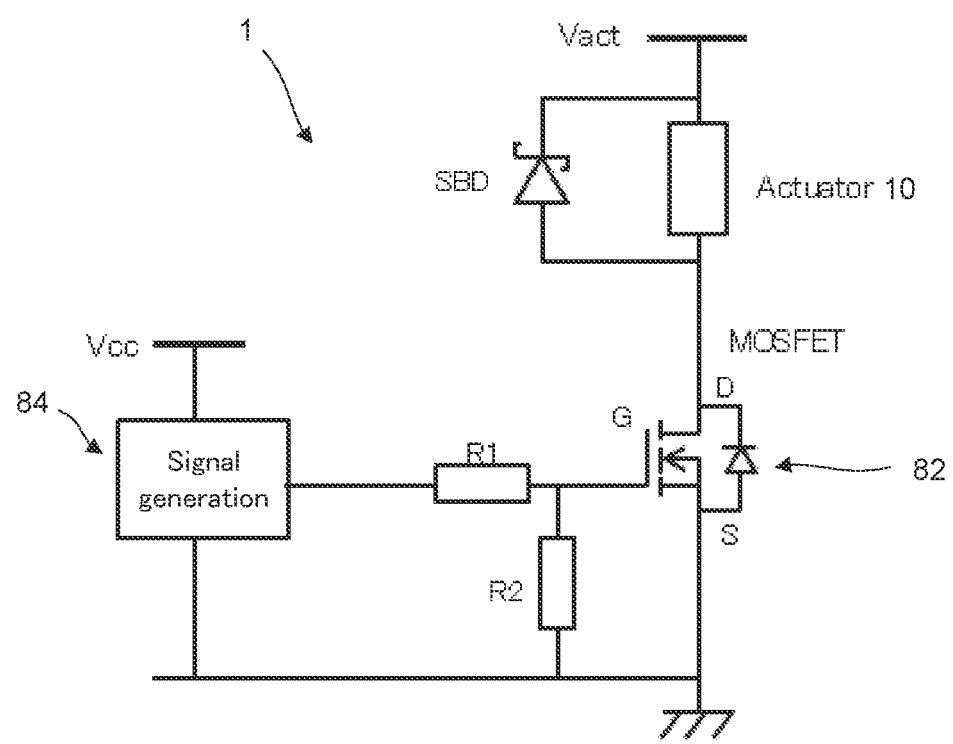
FIG. 10 is an entire configuration diagram for showing the control device according to an embodiment of the present invention.

FIG. 10 is a circuit diagram showing an example of the configuration of a control device according to an embodiment of the present invention.

Control device 1 has a current pulse supply unit and a voltage pulse application unit.

The current pulse supply unit supplies a plurality of drive current pulses to coil 22 of electromagnetic actuator 10 as the drive current for driving the operation device (touch panel 2) in response to the touch operation of the operation device. Further, the current pulse supply unit may supply the plurality of drive current pulses such that the displacement of movable part 40 (touch panel 2) is in the range of 0.03 mm to 0.3 mm after supplying a last drive current pulse among the plurality of drive current pulses.

The voltage pulse application unit intermittently applies a plurality of control voltage pulses for respectively generating the plurality of drive current pulses to the current pulse supply unit.

Further, the voltage pulse applying unit applies a leading control voltage pulse until the current value of the corresponding drive current pulse reaches V/R, where V is the input voltage to the coil and R is the coil resistance of coil 22. Further, the voltage pulse applying unit applies the control voltage pulse except the leading control voltage pulse until an increase in the current value of the corresponding drive current pulse reaches V/R.

Control device 1 shown in FIG. 10 has switching element 82 as a current pulse supply unit configured by a MOSFET (metal-oxide-semiconductor field-effect transistor), signal generating unit (Signal generation) 84 as a voltage pulse application unit, resistors R1, R2, and SBD (Schottky Barrier Diodes).

In control device 1, signal generating unit 84 connected to power supply voltage Vcc is connected to a gate of switching element 82. Switching element 82 is a discharge changeover switch, connected to SBD, and connected to the electromagnetic actuator (shown by [Actuator] in FIG. 10) to which a voltage is supplied from power supply unit Vact.

The current pulse supply unit outputs, as the drive current, a drive current pulse train of one set of two pulses to coil 22 of electromagnetic actuator 10 in response to the touch operation of the operation device by the operator in this embodiment.

Pattern 1

Figure 11:
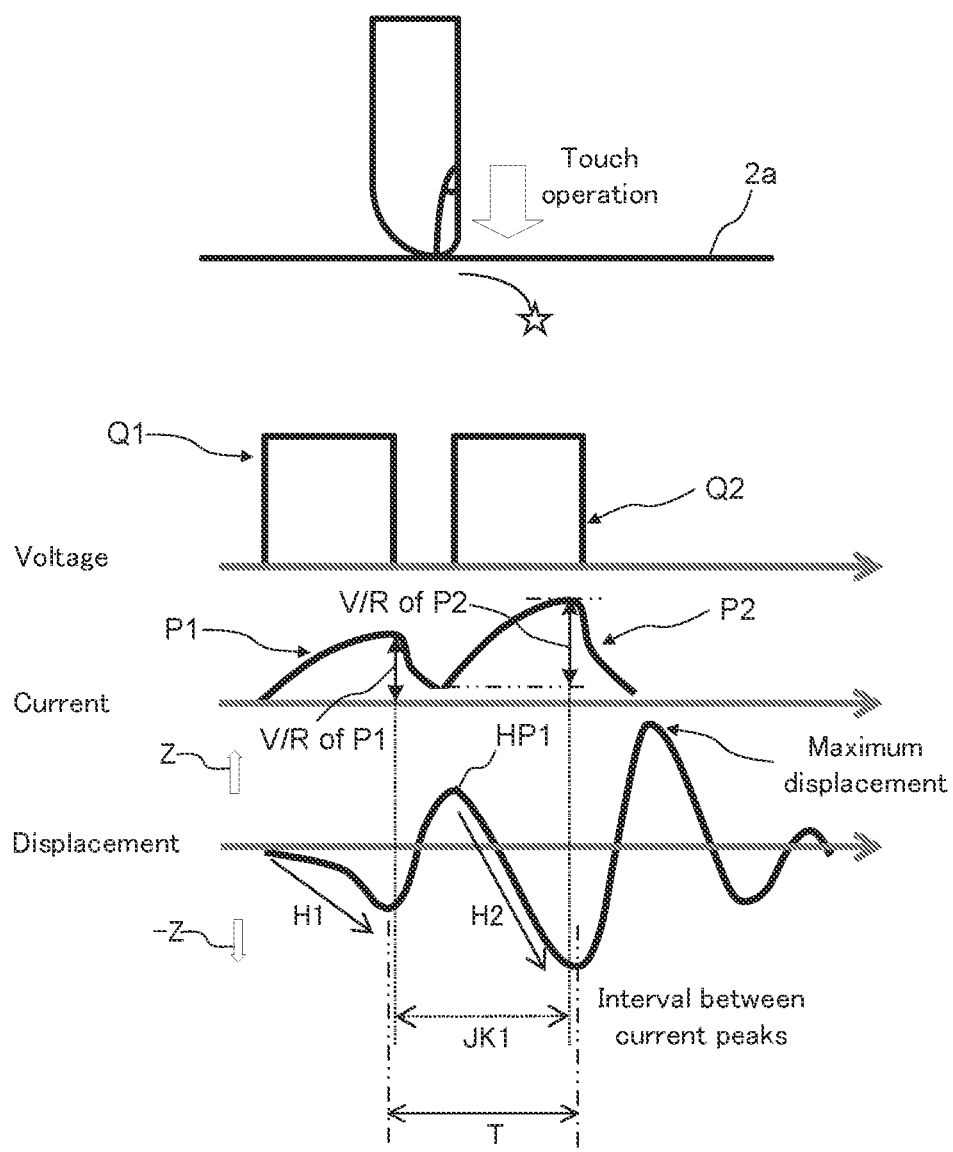
FIG. 11 is a diagram for showing a pattern 1 of a drive current pulse for driving the electromagnetic actuator by the control device according to an embodiment of the present invention.

FIG. 11 is a diagram showing a pattern 1 of a drive current pulse inputted to an electromagnetic actuator of a control device according to an embodiment of the present invention. In FIG. 11, voltage, current and displacement correspond to each other, and displacement corresponds to displacement of movable part 40 or the operation device by the supplied drive current pulse. Also in FIGS. 12 and 13, voltage, current and displacement correspond to each other.

Interval JK1 between peaks for each of drive current pulses P1 and P2 is in the range of ½ times to 1 times vibration period T of the elastic vibration. Period T is a period $T=2\pi\sqrt{(m/Ks)}$ where m is the mass of movable part 40 and Ks is the spring constant of the elastic body elastically supporting the movable part.

For example, when the operator touches and operates screen 2a with finger (finger pulp), the leading drive current pulse among two or more drive current pulses supplied to coil 22 of electromagnetic actuator 10 is supplied, and then second drive current pulse supplied to electromagnetic actuator 10 is supplied after making an interval in the range of ½ times to 1 times vibration period T of the elastic vibration.

When a current flows through electromagnetic actuator 10 due to drive current pulse P1, movable part 40 (touch panel 2 as well) is driven in one direction. Before the current pulse becomes 0, a current flows through electromagnetic actuator 10 due to the following drive current pulse P2, thus increases an output current value and makes a maximum output, thereby the movable part is displaced larger than the displacement caused by drive current pulse P1 only, and the displacement becomes maximum.

That is, movable part 40 is attracted to electromagnetic actuator 10 by drive current pulse P1 and moves (shown by an arrow H1) in one direction (−Z direction).

When drive current pulse P1 is small, control voltage pulse Q1 is applied until the current value of drive current pulse P1 reaches V/R. Then, control voltage pulse Q1 falls, movable part 40 moves in the direction (Z direction) of returning to the standard normal position by the urging force generated by the elastic deformation of plate-shaped elastic section 50, and movable part 40 is displaced to the opposite side beyond the standard normal position corresponding to the amount of attraction by electromagnetic actuator 10. When or after movable part 40 is positioned at the maximum displacement position (HP1) beyond the standard normal position due to the supply of drive current pulse P1, drive current pulse P2 is supplied to coil 22. Thereby, movable part 40 is driven to move (shown by an arrow H2) in one direction (−Z direction) by the electromagnetic force generated by drive current pulse P2 and the urging force of plate-shaped elastic section 50. When drive current pulse P2 increases and reaches V/R (V/R of P2), movable part 40 is displaced from the standard normal position to the maximum displacement position. When control voltage pulse Q2 falls, movable part 40 is released from the attraction state by the electromagnetic force, and moves in the direction opposite to the attraction direction (−Z direction) to displace maximally. Thus, when movable part 40 is maximally displaced, the vibration of electromagnetic actuator 10 is given to the operator as haptic feeling feedback.

Note that it is desirable that the application timing of control voltage pulse Q2 by the voltage pulse application unit is position HP1 at which the maximum displacement in the Z direction by drive current pulse P1. This makes it possible to increase the drive current pulse efficiently and increase the displacement of movable part 40.

Thus, according to control device 1, it is possible to increase the output by efficient driving even for a small product. That is, it is possible to reduce the cost and the thickness by using the electromagnetic actuator, and it is possible to efficiently generate a thrust suitable for the haptic feeling feedback to the operator who touches and operates thereto.

Further, since the thrust of movable part 40 can be increased without increasing the voltage, it is possible to reduce the power consumption and the cost of the drive system, and it is possible to reduce the cost of the entire of a mounted apparatus.

Further, the drive current supplied by control device 1 to electromagnetic actuator 10 may be an input pulse voltage input to electromagnetic actuator 10 as a set of two or more pulses separated by a time interval T1. Thus, the drive control can be performed by voltage input, and the drive control can be realized by a more easy system configuration and a simple circuit configuration.

Here, the voltage pulse application unit applies leading control voltage pulse Q1 applied to electromagnetic actuator 10 (specifically, coil 22) until the current value of the corresponding drive current pulse P1 reaches V/R, where V is the input voltage to coil 22 and R is the coil resistance of the coil. Further, the voltage pulse application unit applies the control voltage pulse other than the leading control voltage pulse Q1, in this case subsequent control voltage pulse Q2, until the current value of the corresponding drive current pulse P2 reaches V/R. Since the output (the thrust that displaces movable part 40) is proportional to the current, in the case that the inductance of coil 22 is large, even if it does not instantly reach the maximum possible input current, it is possible to be the maximum possible input current by applying the control voltage pulse other than the leading control voltage pulse Q1 until the maximum possible input current is reached, and electromagnetic actuator 10 can be driven at an output that is the maximum thrust of movable part 40.

Further, leading control voltage pulse Q1 and subsequent control voltage pulse Q2 have the same pulse width, and the start timing of subsequent control voltage pulse Q2 is after the end timing of leading control voltage pulse Q1 by approximately ½ times (½ to 1 times) of the pulse width of the control voltage pulse. The peak reaching timing (position of V/R of P2) of drive current pulse P2 corresponding to subsequent control voltage pulse Q2 is after the start timing of subsequent control voltage pulse Q2 by ½ times to 1 times the pulse width.

Further, the start timing of the subsequent control voltage pulse (control voltage pulse Q2 in the present embodiment) can be said to be after the end timing of the leading control voltage pulse (control voltage pulse Q1 in the present embodiment) by ½ times to 1 times the vibration period of the elastic vibration. The peak reaching timing of the drive current pulse (drive current pulse P2 in the present embodiment) corresponding to the subsequent control voltage pulse can be said to be after the start timing of the subsequent control voltage pulse by ½ times to 1 times the vibration period of the elastic vibration. As a result, electromagnetic actuator 10 can be driven at an output that is the maximum thrust of movable part 40, as described above.

Pattern 2

Figure 12:
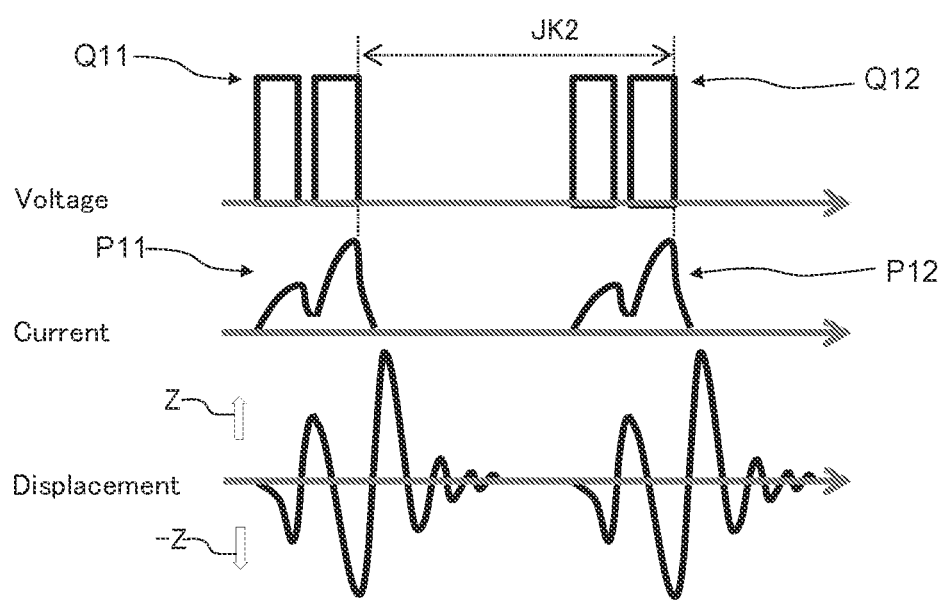
FIG. 12 is a diagram for showing a pattern 2 of a drive current pulse for driving the electromagnetic actuator by the control device according to an embodiment of the present invention.

FIG. 12 is a diagram showing a signal pattern 2 for driving an electromagnetic actuator of a control device according to an embodiment of the present invention.

In the pattern shown in FIG. 12, the current pulse supply unit intermittently supplies a plurality of drive current pulse trains P11 and P12 each including a plurality of drive current pulses to coil 22 of electromagnetic actuator 10. Note that the plurality of drive current pulse trains P11 and P12 respectively correspond to control voltage pulses Q11 and Q12 applied to electromagnetic actuator 10 (specifically, coil 22) by the voltage pulse application unit.

An interval between the plurality of drive current pulse trains P11 and P12 is, for example, 50 to 250 msec. Specifically, the interval between the maximum peaks (JK2) for each of drive current pulse trains P11 and P12 is 50 to 250 msec. This interval is for generating vibration similar to the haptic feeling of the return of the depression of various switches having the depression such as a push switch and giving it as the haptic feeling to the operator. By adjusting this interval to drive movable part 40, various haptic feelings such as tactile switches and push switches can be given.

Thus, even when the haptic feeling reproduced in the operation device is the feeling of a button that transmits a reaction force to the finger when the button is pushed in and then released, the feeling when the depression of the button returns can be given. For example, the haptic feelings of a rocker switch, a tactile switch having a depressed haptic feeling, a rotary encoder having a plurality of concavoconvex haptic feelings when pressed in and released, and a mouse are detected as acceleration, and then it can be reproduced by elastically vibrating electromagnetic actuator 10 to correspond to the acceleration.

Pattern 3

Figure 13:
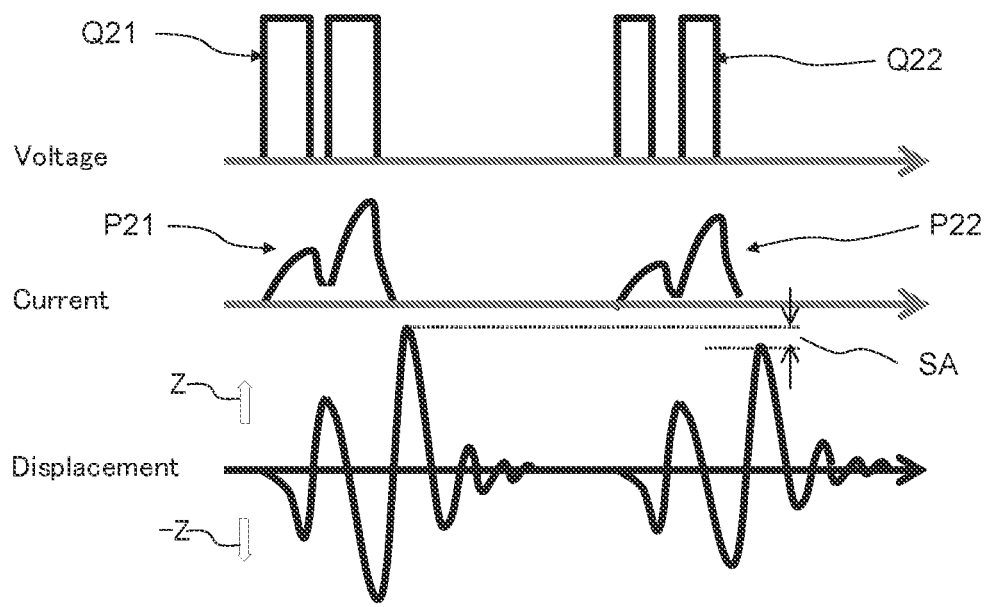
FIG. 13 is a diagram for showing a pattern 3 of a drive current pulse for driving the electromagnetic actuator by the control device according to an embodiment of the present invention.

FIG. 13 is a diagram showing a signal pattern 3 for driving the electromagnetic actuator of the control device according to the embodiment of the present invention. Note that a plurality of drive current pulse trains P21 and P22 correspond to control voltage pulses Q21 and Q22 applied to electromagnetic actuator 10 (specifically, coil 22) by the voltage pulse application unit.

As shown in FIG. 13, in the pattern 3, the current pulse supply unit lowers the maximum peak value in subsequent drive current pulse train P22 with respect to the maximum peak value in leading drive current pulse train P21. Thereby, the haptic feeling caused by the displacement of movable part 40 driven is constituted by the vibration given by subsequent drive current pulse train P22 during an aftereffect of the vibration by the leading drive current pulse train P21 remains. Since the maximum displacement of movable part 40 in the Z direction caused by the supply of subsequent drive current pulse train P22 is smaller than the maximum displacement of movable part 40 in the Z direction caused by the supply of leading drive current pulse train P21 by a difference SA, a feeling more similar to the haptic feeling of the tactile switch can be given.

For example, when two sets of a plurality of drive current pulses are input to electromagnetic actuator 10, the current pulse supply unit sets the maximum displacement of the operation device by the subsequent drive current pulse train to be equal to or less than 0.9 times the maximum displacement of the operation device by the leading drive current pulse train. This displacement is often dependent on a size of a switch.

Thus, according to the present embodiment, it is possible to increase the output by efficient driving even for a small product. Further, it is possible to realize low power consumption, it is possible to reduce the cost without using a magnet or the like, and it is possible to reduce the cost of the entire apparatus.

It is possible to reduce the cost, and it is possible to efficiently generate a thrust of movable part 40 suitable for the haptic feeling feedback to the operator who operates the operation device.

Note that it is preferable that a plurality of plate-shaped elastic parts 50 is fixed at positions symmetrical with respect to the center of movable part 40, but as described above, one plate-shaped elastic part 50 may support movable part 40 so as to be able to vibrate with respect to fixing part 30. Plate-shaped elastic part 50 may include at least two or more arm portions connecting movable part 40 and fixing part 30, and having meander-shaped elastic arm parts 56. Plate-shaped elastic part 50 may be made of a magnetic material. In this case, movable-part side fixing parts (movable-part side attaching parts) 54 of plate-shaped elastic parts 50 are respectively arranged in a winding axis direction of coil 22, or, in a direction perpendicular to the winding axis direction with respect to both end portions of core 24. Movable-part side fixing part 54s of plate-shaped elastic parts 50 form the magnetic paths together with core 24 when coil 22 is energized.

Further, in the configuration of electromagnetic actuator 10, rivets may be used instead of each using the screws 62, 64, 68 for fixing of base part 32 and plate-shaped elastic part 50, and, fixing of plate-shaped elastic part 50 and movable part 40. Rivets consist of a head and a body without a screw part, and are inserted into holes of a members, and members are joined together by plastically deforming by caulking the opposite end of the rivets. The caulking may be performed using, for example, a press machine, a dedicated tool, or the like.

Based on a sensor data of sensor 70, it may be possible to perform correction of the period of the input pulse due to an individual difference of each component, or the like.

As described above, embodiments of the present invention have been described. Note that the above description is illustrative of a preferred embodiment of the present invention, and the scope of the present invention is not limited thereto. That is, the configuration of the device and the shape of each part are only examples, and it is obvious that various modifications and additions to these examples are possible within the scope of the present invention.

In the present embodiment, although the driving direction of the electromagnetic actuator controlled driving by control device 1 is the Z direction, the present invention is not limited thereto. It is possible to obtain the effects such as the above-described efficient driving and strengthening of the vibration even in the direction parallel to the touch surface of the operator, specifically, the X direction or the Y direction.

The disclosures of Japanese Applications 2018-225984, filed on Nov. 30, 2018, including the specification, drawings and abstract, is incorporated herein by reference in its entirety.

INDUSTRIAL APPLICABILITY

The electromagnetic actuator according to the present invention has effects capable of reducing the cost and the thickness by using an electromagnetic actuator, and capable of efficiently generating a thrust suitable for haptic feeling feedback to an operator who touches and operates thereto. For example, in automotive products and industrial equipment, by applying to operation devices in which operations are input by touching an image on a screen with a finger or the like to generate vibration corresponding to the touch operation on the image, it is useful for operation devices such as a touch display device equipped with a touch panel device that can feed back a sense of operation similar to the sense of operation when touching various images such as a mechanical switch displayed on the image.

REFERENCE SIGNS LIST

1 Control device
2 Touch panel
3 Base
10 Electromagnetic actuator
20 Core assembly
22 Coil
24 Core
26 Bobbin
26a, 26b split body
28 Fixing hole
30 Fixing part
32 Base part
32a Attaching part
32b Bottom surface part
33 Fastening hole
36, 48 Opening part
40 Movable part
41 Yoke
44 Surface-part fixing part
44a Fixing surface
46, 47 Attracted surface part
49 Cutout
50, 50-1, 50-2 Plate-shaped elastic part
52 Fixing-part side fixing part
54 Movable-part side fixing part
56 Meander-shaped elastic arm part
62, 64, 68 Screw
70 Strain detection sensor
82 Switching element
84 Signal generating unit
200 Vibration presenting device
241 Core main body
242, 244 Magnetic pole part

The invention claimed is:

1. A vibration presenting device comprising:
an operation device;
an electromagnetic actuator that supports the operation device, and includes:
a core assembly formed by winding a coil around a core,
a yoke disposed to face the core assembly and formed in a shape surrounding the coil, and
an elastic support part configured to connect between the core assembly and the yoke; and
a control device configured to control the electromagnetic actuator to vibrate the operation device in a vibration direction along a first direction by driving the operation device to one direction of the vibration direction, the first direction being a direction orthogonal to a winding axis of the coil,
wherein the control device includes a current pulse supply unit configured to supply a plurality of drive current pulses to the coil as a drive current for driving the operation device in response to a touch operation of the operation device, and
wherein an interval between peaks for each of the drive current pulses is in a range of ½ times to 1 times a vibration period of an elastic vibration of the operation device.

2. The vibration presenting device according to claim 1, the control device further includes a voltage pulse application unit configured to intermittently apply a plurality of control voltage pulses for respectively generating the plurality of drive current pulses to the current pulse supply unit.

3. The vibration presenting device according to claim 2, wherein the voltage pulse applying unit is configured to apply a leading control voltage pulse until a current value of a corresponding drive current pulse reaches V/R, where an input voltage to the coil is V and a coil resistance of the coil is R.

4. The vibration presenting device according to claim 3, wherein a current value at a beginning of a control voltage pulse other than the leading control voltage pulse is equal to a current value at an end of the leading control voltage pulse, and
the voltage pulse applying unit is configured to apply the control voltage pulse other than the leading control voltage pulse until an increase in a current value of a corresponding drive current pulse reaches V/R.

5. The vibration presenting device according to claim 4, wherein the current pulse supply unit is configured to intermittently supply a plurality of drive current pulse trains each including the plurality of drive current pulses.

6. The vibration presenting device according to claim 5, wherein an interval between maximum peaks for each of the drive current pulse trains is 50 to 250 msec.

7. The vibration presenting device according to claim 5, wherein the current pulse supply unit is configured to lower a maximum peak value in a subsequent drive current pulse train with respect to a maximum peak value in a leading drive current pulse train.

8. The vibration presenting device according to claim 1, wherein the current pulse supply unit is configured to supply the plurality of drive current pulses such that a displacement of the movable part is in a range of 0.03 mm to 0.3 mm after supplying a last drive current pulse.

9. The vibration presenting device according to claim 2, wherein a leading control voltage pulse and a subsequent control voltage pulse have a same pulse width,
a start timing of the subsequent control voltage pulse is when the operation device is located between positions from a first position to a second position; the first position being where the operation device starts moving in the one direction again by the elastic vibration after the operation device driven by the supply of the leading control voltage pulse is displaced in the one direction and then the operation device is displaced in a direction opposite to the one direction; and the second position being where the operation device starts moving in the direction opposite to the one direction again after the operation device is displaced in the one direction again.

10. The vibration presenting device according to claim 1, wherein both ends of the core is extended out of the coil,
the yoke is disposed to face the both ends with a gap therebetween in the first direction,
the elastic support part is disposed between the core assembly and the yoke, and configured to elastically support the core assembly and the yoke each other so that at least one end of the both ends and the yoke are relatively movable in the first direction.

* * * * *